March 30, 1971                E. W. ANTHON                3,572,998
               LIQUID SAMPLING AND PIPETTING APPARATUS
Filed May 12, 1969                              3 Sheets-Sheet 1
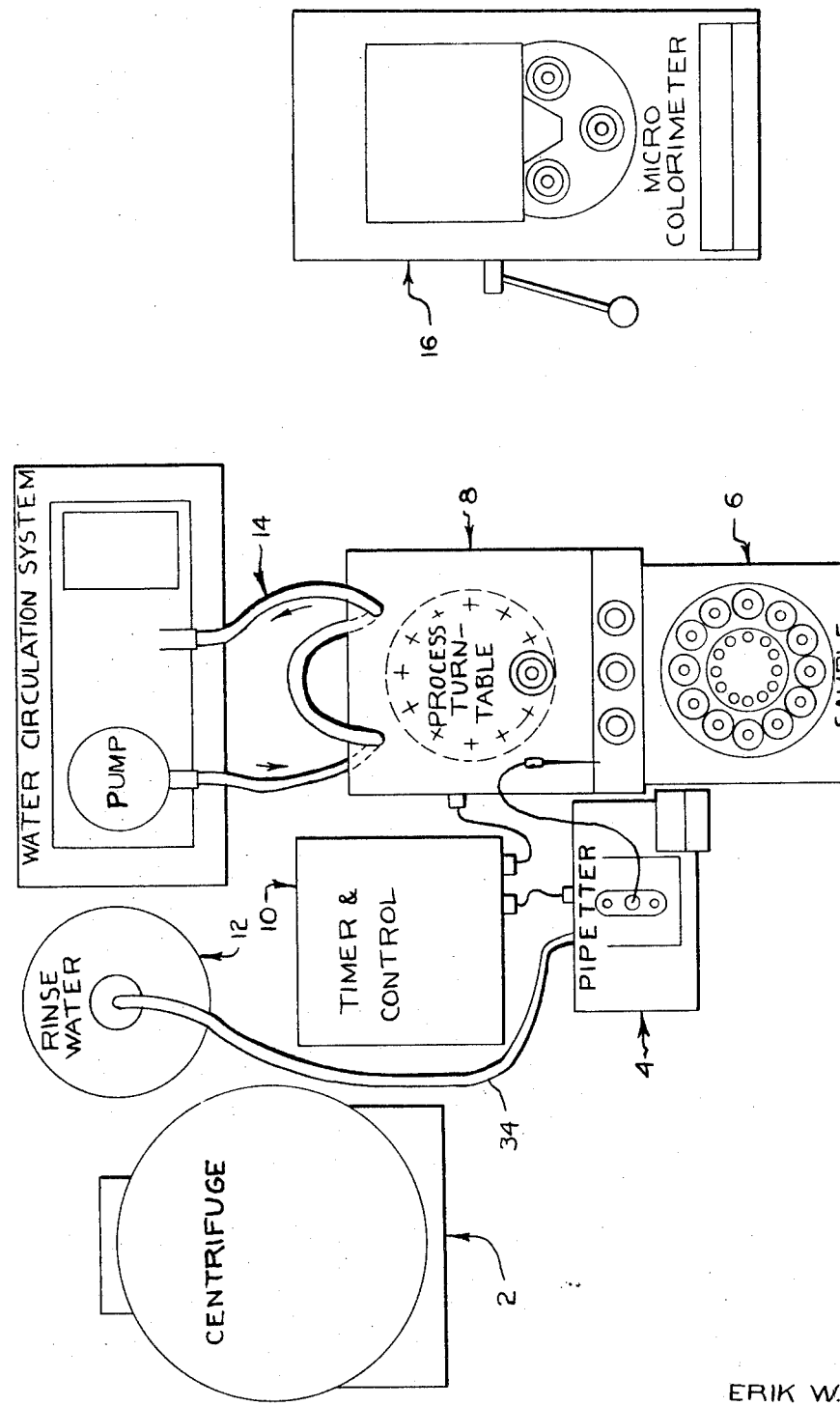
INVENTOR.
ERIK W. ANTHON
BY
Robert J. Bird
ATTORNEY

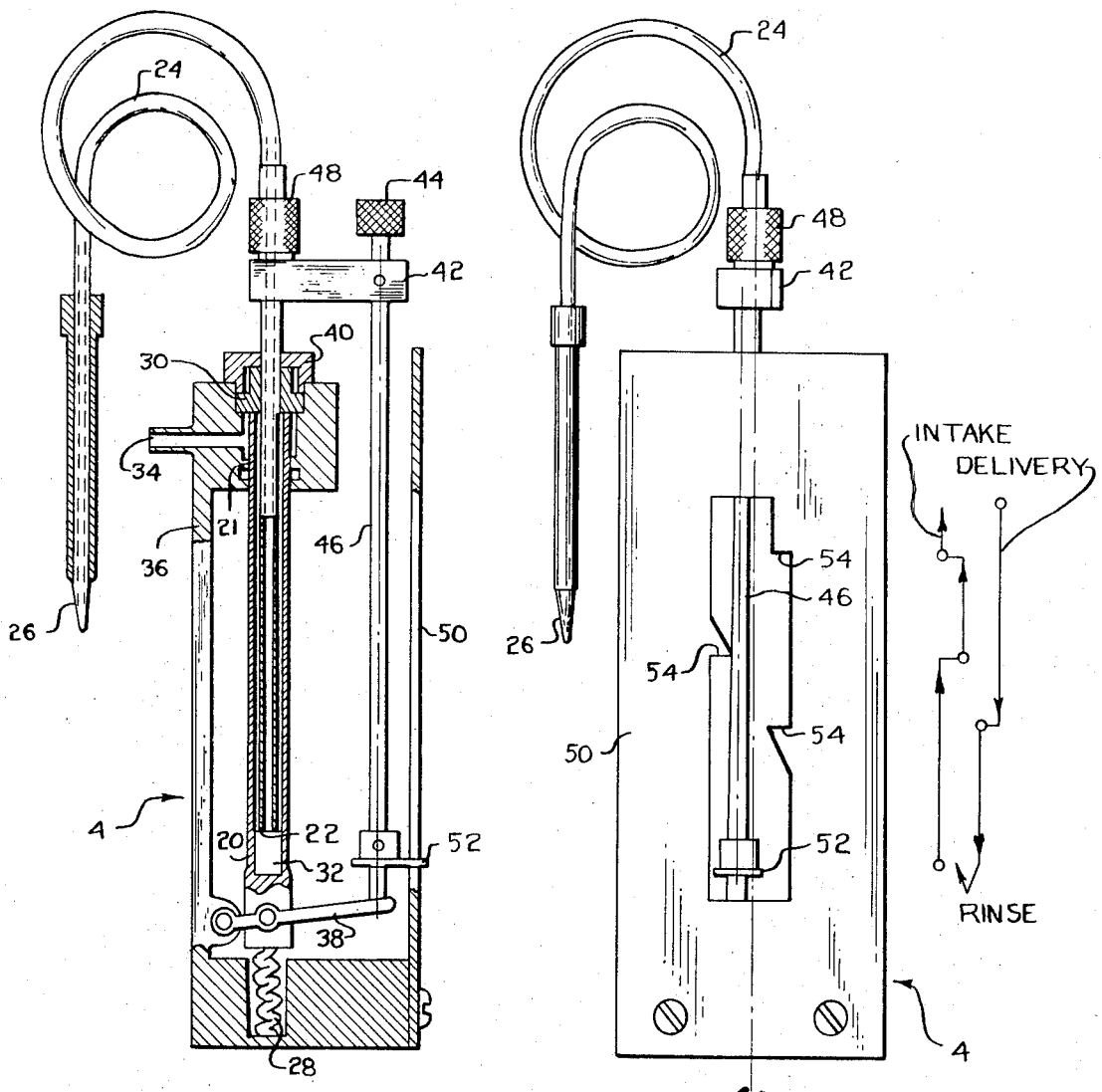

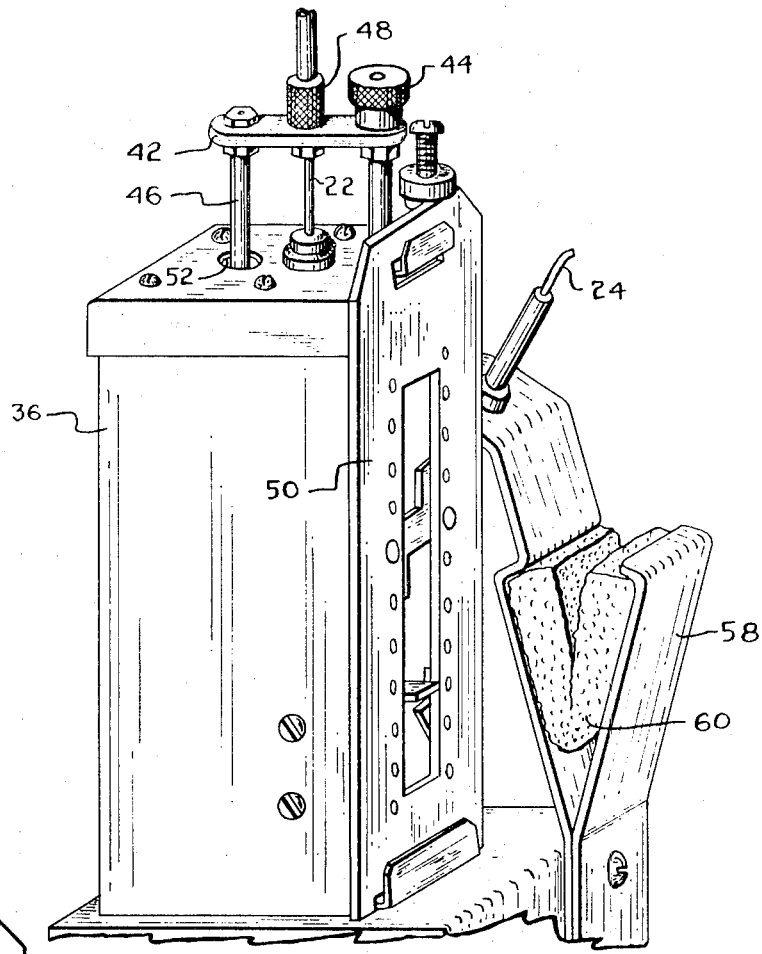
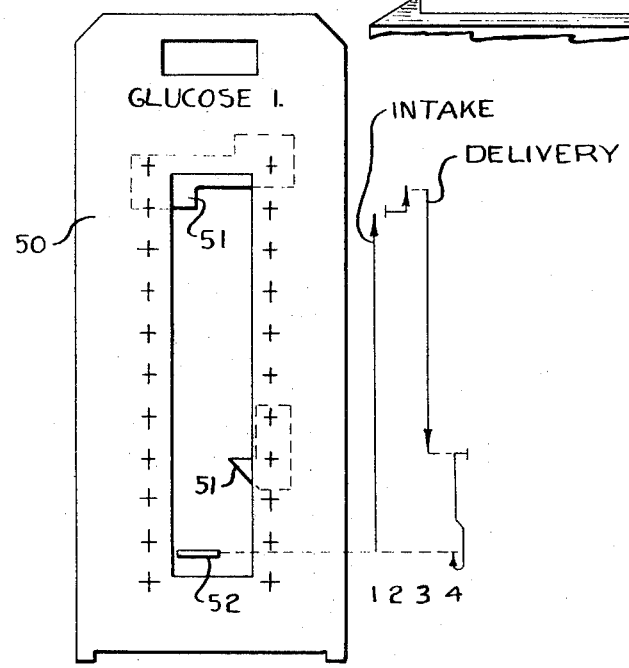

United States Patent Office 3,572,998
Patented Mar. 30, 1971

3,572,998
LIQUID SAMPLING AND PIPETTING APPARATUS
Erik W. Anthon, 534 Kenyon Ave.,
Kensington, Calif. 94708
Filed May 12, 1969, Ser. No. 823,697
Int. Cl. B01l 3/02
U.S. Cl. 23—259                                  5 Claims

ABSTRACT OF THE DISCLOSURE

A pipetting and sampling apparatus for receiving and dispensing micro samples including a fine tubular piston extendable from a pump chamber, the liquid flowing through the tubular piston. A template and follower program the movement of the piston.

BACKGROUND OF THE INVENTION

The present invention is related generally to automated chemical analysis apparatus and in particular to a pipetting apparatus for the sampling of very small amounts of sample and reagent, or micro samples.

In many types of chemical analyses, involving a great number of samples of similar character, the repetitive performance of the chemical operations lends itself to automation. The use of automatic analyzing equipment greatly increases laboratory efficiency, economy, and has the further advantage of increasing accuracy of the analyses. Present automated chemistry systems are generally usable in connection with samples and reagents in macroscopic quantities, that is, in quantities of the general order of milliliters.

The present invention is a step forward in the art by providing an apparatus for the automated pipetting of chemical samples in micro quantities.

Accordingly, it is an object of the present invention to provide an automated pipetting apparatus for performing sampling in micro quantities.

Other objects, advantages and features of the present invention will become apparent from the following description thereof, taken in connection with the accompanying drawing.

SUMMARY OF THE INVENTION

Briefly, the present invention is a pipetter which includes a piston reciprocable relative to a pump chamber. A template and follower fastened to the piston rod program its movement. The piston is a fine hollow tube, the pump displacement flowing therethrough.

DRAWING

In the drawing:

FIG. 1 is an over-all view of a complete micro chemistry system showing the environment of which the present invention is a part;

FIG. 2 is a side elevation, partly in section, of the basic elements of a micro pipetter used in connection with the present invention;

FIG. 3 is a front elevation view of the same apparatus shown in FIG. 1;

FIG. 4 is a perspective view of the micro pipetter; and

FIG. 5 is a view of a stop plate including an example of stop elements appropriate to one particular chemical analysis.

DESCRIPTION

Referring now to FIG. 1, there is shown the over-all combination of elements which make up an automated analytical apparatus of which the present invention is a part. Included are a centrifuge 2, a pipetter 4, a sample turntable 6, a process turntable 8, a timer and control element 10, a rinse water source 12, a water circulation system 14, and a micro colorimeter 16.

Referring now to FIG. 2, in which the micro pipetter is shown in more detail, there is shown a pump cylinder or casing 20 within which is disposed a movable piston 22. Piston 22 is itself a hollow tube and is connected at one end to a flexible probe tube 24 which terminates in a pipette tip 26 of a fine diameter. Probe tube 24 and pipette tip 26 are of a capacity greater than the displacement of piston 22. Pump cylinder 20 is closed at its bottom end and open at its top end through an opening or valve port 21. However, its top end is biased by a valve closing spring 28 against a valve seat 30, and when so biased, cylinder 20 is a closed pump chamber 32.

A rinse water inlet line 34 communicates with valve seat 30 such that when cylinder 20 is depressed against spring 28, water from 34 is in communication with the interior of pump chamber 32. Rinse water line 34 communicates with a source of rinse water under motivating pressure which is shown at 12 in FIG. 1. This rinse water source may be of any convenient type.

Spring 28, rinse water inlet line 34, and valve seat 30 are all disposed relative to pump cylinder 20 by means of a frame 36. Frame 36 further includes a valve actuating lever 38 which is fulcrumed on frame 36 and is pivotally connected also to pump cylinder 20. By means of lever 38, the valve-closing force of spring 28 can be overcome so as to open chamber 32 to rinse water inlet line 34.

Piston 22 is movable relative to cylinder 20 through a seal member 30 which is, in fact, the same member which serves as valve seat 30. Member 30 will be hereinafter sometimes referred to as closure member 30 to indicate its dual nature. Closure member 30 is preferably made of Teflon and is kept in proper sealing adjustment relative to movable piston 22 by means of a suitable gland 40.

A yoke member 42 is fastened to piston 22. Yoke member 42 has a handle 44 and also has connected to it a guide rod 46 extending downwardly therefrom generally parallel to piston 22. Guide rod 46 is of such a length that when piston 22 is at or near its bottom position relative to cylinder 20, rod 46 is in abutting relation with lever 38. A suitable fitting or connection 48 connects piston 22 to probe tube 24 to effect a continuous fluid passage therethrough.

There is fixedly mounted to frame 36 extending upwardly and in a plane parallel to the axis of guide rod 46 a template or stop plate 50. Guide rod 46 includes a template follower or stop member 52 which is fixed to rod 46 and extends outwardly therefrom through an aperture in the stop plate 50.

Referring now to FIG. 3, showing a frontal view of the same apparatus as in FIG. 2, the stop plate 50 is clearly shown. The aperture in stop plate 50 permits the extension therethrough of stop member 52. A plurality of stops or abutments 54 extend from the plate 50 into the aperture.

In operation, the pipetter works as follows. Initially, handle 44 and guide rod 46 along with piston 22 are depressed so as to depress valve actuator 38. This opens the valve at seat 30 permitting rinse water to flow through inlet 34 filling chamber 32 and flowing through the hollow interior of piston 22, probe tube 24, and pipette tip 26 to rinse and fill the system. The pipette tip is then immersed in the sample or reagent which it is desired to take in. Upon raising handle 44 and piston 22, there is liquid intake at the pipette tip 26. Handle 44 is raised until stop member 52 abuts against the first stop 54. Thus, there has been a controlled intake of liquid. Guide rod 46 is laterally displaceable to a small extent. This enables the stop member 52 to be moved laterally away from abutment 54 for a further intake when the tip 26 is placed in another liquid. Piston 22 is then raised another step to take in another quantity of this second liquid until stop member 50 reaches the next abutment 54. Again, guide rod 46 can be shifted laterally to avoid this abutment 54 whereupon the rod can be raised again, and so on. These incremental liftings of the guide rod and piston 22 have resulted in accurate sample and reagent intake. The pipette discharge is similarly controlled on the downstroke by suitable abutment members 54 which are oppositely facing. The arrow sketches next to FIG. 3 illustrate the travel of piston 22 as controlled by template 50 and follower 52.

The micro pipetter derives its accuracy from its rigid hydraulic system and its small piston diameter. As an example, the piston diameter is .065 inch and the maximum stroke is 3.75 inches. This gives a total displacement of 180 microliters (less than 1/5 cc.). The pump cylinder is .085 inch inside diameter. The small clearance between piston and pump cylinder helps prevent air bubbles from being trapped in the pump.

The piston is made from stainless steel hypodermic needle tubing, since such tubing is corrosion resistant, has a very smooth surface, and is manufactured to an accurate tolerance.

Referring now to FIG. 4, showing a perspective view of the micro pipetter, it will be seen that the piston is rigidly supported on a sliding frame which includes yoke 42 and a pair of guide rods 46 (only one of which was shown in FIG. 1) rigidly attached. FIG. 4 further shows a stop plate 50 identifying the chemical analysis for which it is appropriate. This illustrates another convenient aspect of this invention. A special template or stop plate 50 may be prepared for a given chemical analysis, separately stored, and mounted to the pipetter when needed for a particular test. In other words, each individual stop plate 50 is, in fact, a program for the pipetter.

Referring now to FIG. 5, a single stop plate 50 is shown. This stop plate 50 is a universal or skeleton plate to which may be fastened by means of suitable fasteners a variety of indiivdual stop plates, as exemplified at 51. These can be mounted to plate 50 in any desired combination appropriate to a particular chemical analysis to be performed. This feature enables these plates to be more accurately machined.

FIG. 4 further shows the sliding frame mounted relative to the pipetter frame 36 such that yoke 42 is slightly rotatable on the axis of pump piston 22. The elongated apertures 56 in frame 36 permit slight lateral movement of guide rods 46 for the purpose of moving stop member 52 clear of stops or abutments 54.

The tip of the probe tube 26 must be wiped between pipettings to prevent carry over. A bracket 58 is provided which holds a piece of polyurethane foam sponge 60. This sponge is well suited for probe wiping being soft and having a very low capillary action. A strong capillary action would tend to draw liquid out through the probe tip causing volume errors.

The micro pipetter is equipped with a micro switch, not shown, that is operatively connected with timer and control element 10. The micro switch closes when piston 22 is at its bottom-most position, this switch closure actuating the sample and process turntables.

It will be apparent that a pipette has herein been described which is of greatly increased sensitivity and accuracy to fractions of microliters.

It may occur to others of ordinary skill in the art to make modifications of the present invention which will remain within the concept and scope thereof and not constitute a departure therefrom. Accordingly, it is intended that the invention be not limited by the details in which it has been described, but that it encompass all within the purview of the following claims.

What is claimed is:
1. A liquid pipetting apparatus including:
   a frame,
   a pump casing defining a pump chamber and an opening therefrom and being biased relative to said frame and against a closure member to cover said opening, said closure member being mounted on said frame,
   a liquid inlet line communicating with a source of liquid under pressure and with said opening,
   a pump piston projecting into said chamber, movable relative thereto, and extending therefrom through said closure member,
   a pipette tube extending from and in communication with said chamber, and
   said apparatus being effective, when said pipette tube is immersed in a liquid and said piston moved in a direction away from said chamber, to draw in such liquid, and when said piston is moved in a direction toward said chamber to discharge liquid, and when said chamber is opened to communication with said liquid inlet line to rinse said pipette tube.
2. A liquid pipetting apparatus as defined in claim 1 in which said piston comprises a hollow tube which is series-connected at its external end with said pipette tube.
3. A liquid pipetting apparatus as defined in claim 2 in which said casing is biased against said closure member by a spring, and further including:
   a guide rod fixed to said piston and operatively connected to said spring when said piston is substantially at the bottom of its stroke to depress said spring with further downward movement of said rod to open said chamber to said liquid inlet line.
4. A liquid pipetting apparatus as defined in claim 3 further including a lever pivoted on said frame and said chamber to abut said rod when said piston is substantially at the bottom of its stroke.
5. A liquid pipetting apparatus as defined in claim 3 in which said guide rod has fixed thereto a stop member, and further including:
   a template fastened to said frame, said template being in operative relationship to said guide member and effective to program the incremental movements thereof as said piston is moved through its cycle.

References Cited
UNITED STATES PATENTS

| | | | |
|---|---|---|---|
| 3,184,122 | 5/1965 | Nerenberg | 23—259X |
| 3,192,969 | 7/1965 | Baruch et al. | 23—259X |
| 3,421,858 | 1/1969 | Quinn | 23—253 |
| 3,484,207 | 12/1969 | Anthon | 23—253 |

MORRIS O. WOLK, Primary Examiner

R. E. SERWIN, Assistant Examiner

U.S. Cl. X.R.

23—253; 73—425.6; 141—23; 222—148, 309